United States Patent
Le et al.

(10) Patent No.: US 7,718,582 B2
(45) Date of Patent: May 18, 2010

(54) METHOD FOR TREATING SUBTERRANEAN FORMATION WITH ENHANCED VISCOSITY FOAM

(75) Inventors: Hoang Le, Spring, TX (US); Alexander Batrashkin, Moscow (RU); Jeffrey C. Dawson, Conroe, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 12/129,478

(22) Filed: May 29, 2008

(65) Prior Publication Data
US 2009/0298719 A1    Dec. 3, 2009

(51) Int. Cl.
C09K 8/60 (2006.01)
C09K 8/588 (2006.01)

(52) U.S. Cl. .................. 507/202; 507/225; 507/261
(58) Field of Classification Search .............. 507/202, 507/225, 261
See application file for complete search history.

(56) References Cited

U.S. PATENT DOCUMENTS

| | | | |
|---|---|---|---|
| 3,981,363 A * | 9/1976 | Gall | ............ 166/270 |
| 5,002,125 A | 3/1991 | Phillips | |
| 5,069,283 A | 12/1991 | Mack | |
| 5,305,832 A | 4/1994 | Gupta | |
| 5,424,285 A | 6/1995 | Stacy | |
| 5,515,920 A | 5/1996 | Luk | |
| 5,547,026 A | 8/1996 | Brannon | |
| 5,558,160 A | 9/1996 | Tudor | |
| 5,780,395 A * | 7/1998 | Sydansk | ............ 507/202 |
| 5,874,385 A | 2/1999 | Mzik | |
| 6,017,855 A | 1/2000 | Dawson | |
| 6,169,058 B1 | 1/2001 | Le | |
| 6,410,489 B1 | 6/2002 | Zhang | |
| 6,468,945 B1 | 10/2002 | Zhang | |
| 6,509,300 B1 | 1/2003 | Gupta | |
| 6,729,409 B1 | 5/2004 | Gupta | |
| 6,793,018 B2 | 9/2004 | Dawson | |
| 6,844,296 B2 | 1/2005 | Dawson | |
| 6,875,728 B2 | 4/2005 | Gupta | |
| 7,007,757 B2 | 3/2006 | Gupta | |
| 7,049,436 B2 | 5/2006 | Gupta | |
| 7,201,227 B2 | 4/2007 | Gupta | |
| 7,347,265 B2 | 3/2008 | Monroe | |
| 2004/0138071 A1 | 7/2004 | Gupta | |
| 2005/0272612 A1 | 12/2005 | Dawson | |

OTHER PUBLICATIONS

U.S. Appl. No. 11/714,683, filed Mar. 6, 2007, Brown.

* cited by examiner

Primary Examiner—Timothy J. Kugel
Assistant Examiner—Atnaf Admasu
(74) Attorney, Agent, or Firm—Jones & Smith, LLP

(57) ABSTRACT

A method for treating a subterranean formation by introducing into a gas or oil well a stable foam well treatment fluid which exhibits high viscosity. The well treatment fluid is prepared by first forming a mixture of crosslinking agent and foaming agent and then introducing the mixture to an aqueous fluid containing a crosslinkable polymer followed by the addition of a gas or gaseous liquid.

19 Claims, 1 Drawing Sheet

METHOD FOR TREATING SUBTERRANEAN FORMATION WITH ENHANCED VISCOSITY FOAM

FIELD OF THE INVENTION

The invention relates to a method for treating a subterranean formation by introducing into a gas or oil well and/or formation a stable foam well treatment fluid which exhibits high viscosity.

BACKGROUND OF THE INVENTION

When treating a subterranean formation which is sensitive to water, it is often necessary to minimize the amount of water in the well treatment fluid. In such instances, it is typically preferred to mix a gas with the treatment fluid. This allows for a reduction in the amount of water without loss of treatment fluid volume. In some instances, the gas is mixed with the treatment fluid in order to assist in the recovery of the fluid after treatment of the formation is concluded. Suitable gases include nitrogen and carbon dioxide. In some cases, a mixture of such gases may be used. A mixture of two of such gases is referred to as a binary composition.

Typically, when the amount of gas in the treatment fluid exceeds 30% by volume, a foaming agent is further added to the fluid in order to create a foamed fluid. The addition of a foam typically increases the viscosity of the treatment fluid. Where the amount of gas and foaming agent in the treatment fluid is greater than 63 volume percent, the fluid is termed as being "energized". In addition to increasing viscosity, the foaming agent further contributes to the stability of the resulting fluid. Typical foaming agents include surfactants based on betaines, alpha olefin sulfonates, sulfate ethers, ethoxylated sulfate ethers and ethoxylates. Alpha olefin sulfonates are often preferred since they exhibit greater tolerance to oil contamination, such as that which originates from hydrocarbon based polymer slurries.

Often, well treatment fluids, such as those used as fracturing fluids, are either non-viscosified aqueous-based solutions (usually introduced into the formation at a high pumping rate) or are viscosified aqueous-based fluids. Hydraulic fracturing is the process of enhancing oil and/or gas production from producing wells or enhancing the injection of water or other fluids into injection wells. Fracturing fluids are usually injected into the wellbore and pass down tubulars within the wellbore into the formation. Once natural reservoir pressures are exceeded, the confining stresses in the formation cause the formation to fail, thereby inducing a fracture. A proppant is then deposited in the fracture, where it remains after the treatment is completed. The proppant serves to hold the fracture open, thereby enhancing the ability of fluids to migrate from the formation to the wellbore through the fracture.

Most viscosified fluids used in fracturing fluids are composed of water-soluble polymers which have been hydrated in water and chemically modified with crosslinking agents in order to increase fluid viscosity. Typical of such water-soluble polymers are those based on guar gum and include guar derivatives as well as cellulosic derivatives, xanthan and carrageenan. Commonly used crosslinking agents are those capable of providing borate ions as well as those agents which contain a metal ion such as aluminum, zirconium and titanium. Such viscosified fluids form three-dimensional gels. The viscosity of such fluids is sufficient to adequately carry and place proppant into the formation.

Further, viscosified fluids have been used in blocking gels. Such gels are used to isolate and protect the production zone of the well from damage. For instance, production from wellbore operations is typically temporarily ceased in order to perform such auxiliary procedures as workover operations. Such operations frequently use heavy brines and other fluids to maintain pressure control within the reservoir. Such fluids can leak-off into the production zone, causing damage which interferes with the efficient operation of the well. Temporary blocking gels are thus used to isolate and protect the production zone. Blocking gels formed by viscous fluids produce a relatively impermeable barrier across the production formation. The barrier cordons off the production zone from the area undergoing the workover operations until production is resumed after removal of the blocking gel.

In those instances where it is desired to use a foaming agent in order to treat a water sensitive formation, it has been found that many crosslinking agents are less effective in the presence of certain foaming agents, such as alpha olefin sulfonates. The ultimate effect is a substantial loss of foam viscosity. While loss in viscosity may be overcome by the addition of greater amounts of crosslinking agent to the polymer solution, the amount of additional crosslinking agent which must be added is often staggering. For instance, in some cases, the crosslinker concentration must be increased by 300%. This causes a substantial increase in the treatment cost.

More cost effective methodologies have therefore been sought for foamed well treatment fluids. Such alternative methodologies must be capable of providing foamed well treatment fluids having the requisite viscosity for the desired operation.

SUMMARY OF THE INVENTION

The method disclosed herein relates to the treatment of a subterranean formation penetrated by an oil or gas well with a foamed well treatment fluid. The fluid introduced into the formation and/or wellbore is referred to herein as the "well treatment fluid". The well treatment fluid has particular applicability as a fracturing fluid and as a temporary blocking gel.

The well treatment fluid is preparing by introducing into an aqueous fluid a mixture of at least one crosslinking agent and at least one foaming agent. The mixture usually contains from about 60 to about 90 weight percent of foaming agent.

The aqueous fluid, to which the mixture containing the crosslinking agent and foaming agent is introduced, contains at least one crosslinkable polymer. The amount of crosslinkable polymer in the aqueous fluid is generally between from about 14 to about 160 pounds of crosslinkable polymer per 1,000 gallons of aqueous fluid, more typically between from about 18 to about 160 pounds of crosslinkable polymer per 1,000 gallons of aqueous fluid. Typically, the amount of crosslinkable polymer in the aqueous fluid is between from about 20 to about 160 pounds of crosslinkable polymer per 1000 gallons of aqueous fluid.

In a preferred embodiment, the well treatment fluid is prepared by first introducing the mixture into the aqueous fluid and then subsequently adding additional crosslinking agent.

The foaming agent is preferably an alkyl ether sulfate, alkoxylated ether sulfate, phosphate ester, alkyl ether phosphate, alkoxylated alcohol phosphate ester, alkyl sulfate or an alpha olefin sulfonate.

Suitable crosslinking agents include those capable of providing a source of borate ions. Further, the crosslinking agent may contain a metal ion, such as aluminum, antimony, zirconium or titanium.

Suitable crosslinkable polymers include cellulosic derivatives, guar and guar derivatives, xanthan and carrageenan.

The pH of the well treatment fluid usually is between from about 3.0 to about 11.5 and more typically is between from about 3.5 to about 5.0.

The well treatment fluid may be prepared on location or may be shipped to the desired location.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
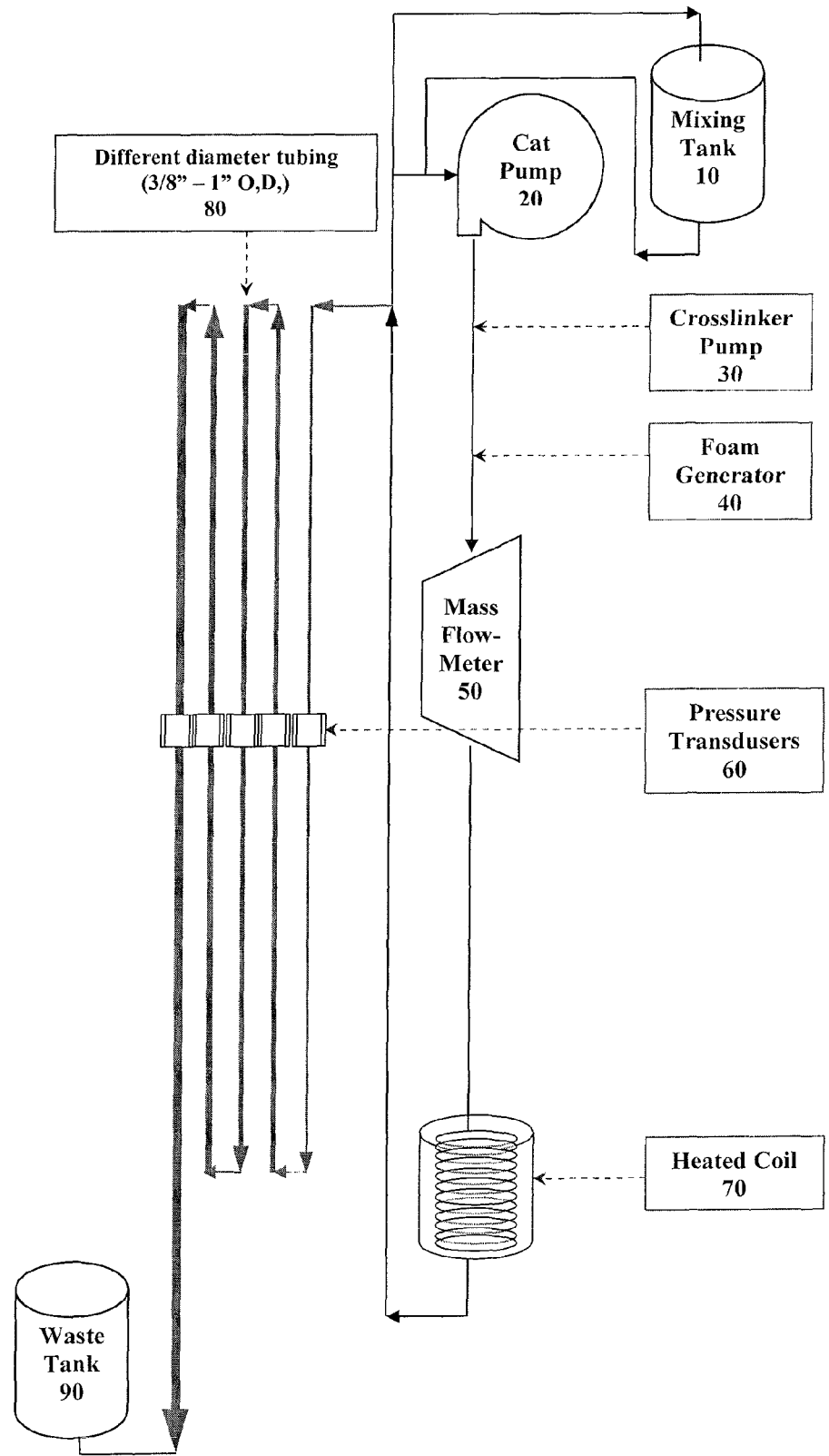
FIG. 1 is a foam flow loop used to demonstrate the method disclosed herein, as discussed in the Examples.

The method disclosed herein relates to the treatment of a subterranean formation which is penetrated by an oil or gas well. The well treatment fluid, which is introduced into the formation and/or wellbore, has particular applicability as a fracturing fluid and as a temporary blocking gel.

The well treatment fluid is preparing by combining a mixture containing at least one crosslinking agent and at least one foaming agent with an aqueous fluid which contains at least one crosslinkable polymer. The mixture is typically added to the aqueous fluid. The fluid resulting from the combination of mixture and aqueous fluid shall be referred to herein as the "combination fluid". More typically, the combination fluid is formed by the addition of a mixture of foaming agent and a small amount of crosslinking agent to the aqueous fluid. The remaining requisite amount of crosslinking agent may then be added to the combination fluid.

Upon completion of the addition of all requisite amount of crosslinking agent, gas or gaseous liquid may then be added to form the well treatment fluid.

The viscosity of the foamed well treatment fluid prepared by the method described herein is typically greater than 14 cP and more typically greater than 200 cP, at room temperature.

After the mixture is combined with the aqueous fluid, the viscosity of the combination fluid is substantially equivalent to the viscosity of the aqueous mixture. The method of the invention therefore provides the requisite viscosity to the well treatment fluid without requiring use of an excessive amount of crosslinking agent. In fact, for a given amount of crosslinking agent, the foamed well treatment fluid exhibits higher viscosity and greater stability than a foamed well treatment fluid prepared by the process of the prior art, i.e., the process where the crosslinking agent is not first added to the foaming agent prior to its addition to the polymer solution. For example, by first forming the mixture containing crosslinking agent and foaming agent which is then added to an aqueous solution containing a hydratable polymer, the foamed well treatment fluid may be obtained without the addition of an excess amount of crosslinking agent.

The addition of the mixture to the aqueous fluid to create the combination fluid is beneficial since it minimizes the ability of the crosslinkable polymer in the aqueous fluid to viscosify with the foaming agent. When a mixture of foaming agent and crosslinking agent is not used and where the foaming agent is instead added to an aqueous polymer-containing solution, the foaming agent tends to tie up the polymer. A greater amount of crosslinking agent is therefore required to effectuate viscosification of the well treatment fluid and the stability of the resulting foamed fluid may be jeopardized.

The addition of a mixture containing crosslinking agent and foaming agent to the aqueous fluid containing the polymer permits effective viscosification of the combination fluid and minimizes the generation of foam. A lesser amount of crosslinking agent further needs to be used.

More typically, the amount of crosslinking agent added to the foaming agent to form the mixture is that amount sufficient to prevent a loss in viscosity of the aqueous fluid upon the addition of the mixture to form the combination fluid.

While the mixture may contain initially the entire amount of crosslinking agent required to form the well treatment fluid, it is more preferred to first form a mixture of a small amount of crosslinking agent to the foaming agent to create the combination fluid and then add the remaining requisite amount of crosslinking agent to the fluid. In such instances, the amount of crosslinking agent in the mixture is typically that amount needed to saturate the foaming agent or that amount which is sufficient to prevent a loss in viscosity of the aqueous fluid upon the addition of the mixture to form the combination fluid. After the addition of the mixture to the aqueous fluid to form the combination fluid, additional crosslinking agent is typically added to the combination fluid to generate the fluid to which the gas or gaseous liquid is added.

The amount of crosslinking agent in the well treatment fluid is generally between from about 0.001% to 1.5%, preferably between from about 0.005% to 1.0%, by wt of the well treatment fluid.

The gas used in the well treatment fluid is that amount acceptable for forming a foam. The gas reduces the density and increases the viscosity of the well treatment fluid. Suitable gases include nitrogen and carbon dioxide, inert gases like argon as well as produced natural gas. Nitrogen and inert gases, such as argon, are the preferred gases since they do not contribute to corrosion from oxygen contamination.

The aqueous fluid contains at least one crosslinkable polymer. The crosslinkable polymer is preferably a hydratable polysaccharide derivative, such as a cellulosic derivative, guar or guar derivative, xanthan or carrageenan. Suitable cellulosic derivatives include hydroxyalkyl celluloses like hydroxyethyl cellulose, methylhydroxyethyl cellulose, ethylhydroxyethyl cellulose and methylhydroxypropyl cellulose as well as alkylcarboxyhydroxy celluloses like carboxymethyl hydroxyethyl cellulose (CMHEC) and carboxymethyl cellulose (CMC).

Suitable guar derivatives include hydroxyalkylated guars like hydroxypropyl guar, hydroxyethyl guar and hydroxybutyl guar and modified hydroxyalkylated guars like carboxymethylhydroxypropyl guar, preferably those having a molecular weight of about 1 to about 3 million. The carboxyl content of the such hydratable derivatives may be expressed as Degree of Substitution ("DS") and ranges from about 0.08 to about 0.18 and the hydroxypropyl content may be expressed as Molar Substitution (MS) (defined as the number of moles of hydroxyalkyl groups per mole of anhydroglucose) and ranges between from about 0.2 to about 0.6. Further suitable guar derivatives include carboxymethyl guar (CMG).

The xanthan may be an unmodified xanthan gum, non-acetylated xanthan gum, non-pyruvylated xanthan gum or non-acetylated-non-pyruvylated xanthan gum.

Other suitable hydratable polysaccharides include carrageenan, gum Arabic, tara gum, gum ghatti, karaya, tragacanth, pectin, starch, locust bean gum, scleroglucan, tamarind and derivatives thereof.

Typically, the amount of crosslinkable polymer in the aqueous fluid (prior to the addition of the mixture containing the crosslinking agent and foaming agent) is between from about 14 to about 160 pounds of crosslinkable polymer per 1,000 gallons of aqueous fluid, more typically between from about 18 to about 160 pounds of crosslinkable polymer per 1,000 gallons of aqueous fluid. When the well treatment fluid is used as a blocking gel, the amount of crosslinkable polymer in the aqueous fluid is more typically between from about 40 to about 160 pounds per 1,000 gallons of aqueous fluid. When the well treatment fluid is being used as a fracturing fluid, the amount of crosslinkable polymer in the aqueous fluid is more typically between from about 14 to about 60 pounds per 1,000 gallons of aqueous fluid.

The pH of the well treatment fluid is typically between from about 3.0 to about 11.5. Typically, the pH of the well treatment fluid is buffered to be between from about 3.0 to about 8.0, most preferably between from about 3.5 to about 5.0. While any acid which is capable of maintaining the well treatment composition to the desired pH may be used, weak organic acids, such as acetic acid, are particularly preferred.

The foaming agent may be amphoteric, cationic or anionic. Suitable amphoteric foaming agents include alkyl betaines, alkyl sultaines and alkyl carboxylates.

Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Preferred as alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms.

Preferred alkyl ether sulfates are also salts of the monovalent cations referenced above. The alkyl ether sulfate may be an alkylpolyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Suitable cationic foaming agents include alkyl quaternary ammonium salts, alkyl benzyl quaternary ammonium salts and alkyl amido amine quaternary ammonium salts.

Preferred as foaming agent are alkyl ether sulfates, alkoxylated ether sulfates, phosphate esters, alkyl ether phosphates, alkoxylated alcohol phosphate esters, alkyl sulfates and alpha olefin sulfonates.

The crosslinking agent then crosslinks the polymer chains residing in the foamed fluid. Typically, crosslinking occurs with increased viscosification upon the addition of heat. Crosslinking of the polymer occurs in the foamed fluid.

Any crosslinking agent suitable for crosslinking the crosslinkable polymer in the aqueous fluid may be employed. Preferred crosslinking agents are those which are heat or time activated. The crosslinking agent provides viscosity to the combination fluid as well as the well treatment fluid and is typically a salt which contains a trivalent or higher polyvalent metal ion. Examples of the trivalent or higher polyvalent metal ions include boron, titanium, zirconium, chromium, aluminum, antimony, yttrium, cerium, etc. or a mixture thereof. Boron, titanium and zirconium are preferred.

Examples of titanium salts include titanium diisopropoxide bisacetyl aminate, titanium tetra-2-ethyl hexoxide, titanium tetra-isopropoxide, titanium di-n-butoxy bistriethanol aminate, titanium isopropoxyoctylene glycolate, titanium diisopropoxybistriethanol aminate and titanium chloride.

Examples of zirconium salts include zirconium ammonium carbonate, zirconium chloride, sodium zirconium lactate, zirconium oxyacetate, zirconium acetate, zirconium oxynitrate, zirconium sulfate, tetrabutoxyzirconium, zirconium monoacetyl acetonate, zirconium normal butyrate, zirconium normal propylate, zirconium glycolate and zirconium lactate triethanolamine. The crosslinking agent may optionally be encapsulated.

The crosslinking agent may also be a borate compound or other boron releasing compound. The borate crosslinker can be any borate ion source and includes organoborates, monoborates, polyborates, mineral borates, boric acid, sodium borate, including anhydrous or any hydrate, borate ores such as colemanite or ulexite as well as any other borate complexed to organic compounds to delay the release of the borate ion. When used, the pH of the aqueous fluid containing the crosslinkable polymer is alkaline. The use of materials which suffice as or generate a crosslinker functional as a crosslinker of borate or boron containing compound is disclosed in U.S. Pat. Nos. 5,160,643, 5,145,590, 4,974,077, and U.S. Pat. No. 4,619,776, herein incorporated by reference. The pH of such systems is often adjusted to alkaline values with buffers such as potassium carbonate or mixtures of potassium carbonate and potassium hydroxide. The optimum pH ranges from about 9.5 to 11.5.

Typically, the mixture contains between from about 60 to about 90 weight percent of foaming agent and the weight ratio of active metal in the crosslinking agent to the amphoteric, cationic or anionic group of the foaming agent in the mixture is often between from about 35:4910 to about 215:2800.

Typically, the amount of foaming agent and gas or gaseous liquid in the well treatment fluid is that amount sufficient to provide a foam quality between from about 30 to about 98, preferably 90 percent or higher. The foam quality is a measurement of the lowest amount of liquid volume of well treatment fluid that is required to effectuate the desired result. Thus, a 90 percent quality foam refers to the use of 100 ml of foamed well treatment fluid which, upon destabilization, rendered 10 ml of liquid well treatment fluid.

In addition to a crosslinking agent, the well treatment fluid may further contain additional materials which are usually added to the combination fluid, prior to the addition of gas or gaseous liquid.

For instance, the well treatment fluid may contain a crosslinking delaying agent. The amount of crosslinking delaying agent in the well treatment fluid will vary based on design. Suitable crosslinking or viscosification delaying agents may include organic polyols, such as sodium gluconate; sodium glucoheptonate, sorbitol, mannitol, phosphonates, bicarbonate salt, salts, various inorganic and weak organic acids including aminocarboxylic acids and their, salts (EDTA, DTPA, etc.) and citric acid and mixtures thereof. Preferred crosslinking delaying agents include various organic or inorganic acids, sorbitol as well as mixtures thereof.

Such crosslinking delaying agents, when used, are typically desirous to delay or inhibit the effects of the crosslinking agent and thereby allow for an acceptable pump time of the well treatment composition at lower viscosities. Thus, the crosslinking delaying agent inhibits crosslinking of the polysaccharide until after the well treatment composition is placed at or near desired location in the wellbore.

Along with crosslinking delaying agents, the well treatment fluid may further contain a complexing agent, gel breaker, surfactant, biocide, surface tension reducing agent, scale inhibitor, gas hydrate inhibitor, polymer specific enzyme breaker, oxidative breaker, buffer, clay stabilizer, acid or a mixture thereof and other well treatment additives known in the art. When present, such additives are typically added to the combination fluid. The addition of such additives to the combination fluid minimizes the need for additional pumps required to add such materials on the fly.

Further, acceptable additives may also include internal gel breakers. (An external breaker, applied after the well treatment fluid is pumped into the formation, may further be used especially at elevated temperatures.) Breakers commonly used in the industry may be used including inorganic, as well as organic, acids, such as hydrochloric acid, acetic acid, formic acid, and polyglycolic acid; persulfates, like ammonium persulfate; calcium peroxide; triethanolamines; sodium perborate; other oxidizers; antioxidizers; and mixtures thereof.

Further, the well treatment fluid may use an enzyme breaker. Typically, the enzyme breaker system is a mixture of highly specific enzymes which, for all practical purposes, completely degrade the backbone of the crosslinked polymer which is formed.

The well treatment fluid may be prepared on location using a high shear foam generator or may be shipped to the desired location.

Where the well treatment fluid is used as a fracturing fluid, the well treatment fluid may further contain a proppant. Suitable proppants include those conventionally known in the art including quartz sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc.

Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material.

When present, the amount of proppant in the well treatment fluid is typically between from about 0.5 to about 12.0, preferably between from about 1 to about 8.0, pounds of proppant per gallon of well treatment fluid.

When used in hydraulic fracturing, the well treatment fluid may be injected into a subterranean formation in conjunction with other treatments at pressures sufficiently high enough to cause the formation or enlargement of fractures or to otherwise expose the proppant material to formation closure stress. Such other treatments may be near wellbore in nature (affecting near wellbore regions) and may be directed toward improving wellbore productivity and/or controlling the production of fracture proppant.

The well treatment fluid may also function as a temporary blocking gel to provide fluid loss control in deep, hot wells and to block non-productive, thief zones. As such, the well treatment fluid may be used to prevent lost circulation during drilling operations. For instance, it may be applied after perforating to enable safe retrieval of gun assemblies, following well completion or workover procedures, or in other circumstances, such as those which require a removable, high viscosity polymer pill. The well treatment fluid may be used, for instance, to seal open holes and perforations, holding the differential pressure required to hold a full column of fluid in the well. The temporary blocking gel is capable of forming a thin filter cake when the well treatment fluid is pumped at a rate sufficient to coat the formation interval.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Comparative Example 1

A fluid was prepared by mixing 142 l of an oil based slurry containing 44% (by wt) carboxymethyl guar in 190 l of tap water containing 190 ml of a 50% solution of tetramethyl ammonium chloride. Also, 190 ml of a fluorosurfactant solution, commercially available as Inflo-150 from BJ Services Company, was added as well as 1.32 l of a foaming agent containing between 40 and 70% α-olefin sulfonate, commercially available as ASP-185 from Nalco Chemicals. The fluid was finally treated with 265 ml of a zirconium crosslinking agent containing 5.58% (by wt) zirconium (calculated as $ZrO_2$) and 70% (by vol.) carbon dioxide while pumping into the foam flow loop exhibited in FIG. 1.

The foam loop was composed of one 30 to 50 gallon mixing tank 10 and for holding the polymer solution, which was introduced into triplex Cat pump 20. The crosslinking agent was added in crosslinker pump 30 and uniformly mixed with the polymer solution prior to foam generator. Foam generator 40 allowed for the injection at 90° of foam to the fluid flow direction. The fluid was then pre-conditioned to formation temperature by flowing it at a desired flow rate, with feedback from mass flow meter 50, through heated 1000 to 3000 ft. coil 70 and then trough stainless steel tubing with various diameters 80. Once the fluid passed through the tubes it was collected in the waste tank. Viscosity was determined by measuring the pressure drop, flow rate and density across five different diameter and length tubes simultaneously by use of pressure transducer 60. These measurements provide up to five rates and stresses used to calculate the Power Law Indices, n' and K' and viscosity at various shear rates. In addition, measurements were taken by an automated, data acquisition unit and computer for real time viscosity analysis. A viewing cell was also built into the line to observe foam quality which could be isolated to measure foam half-life. The loop further had a back-pressure regulator and data storage equipment.

The apparent viscosity was calculated from the Power Law Indices, n' and K', as defined in the American Petroleum Institute's ANSI/API Recommended Practice 13M entitled "Recommended Practice for the Measurement of Viscous Properties of Completion Fluids", First Edition 2004. The viscosity was calculated at 40 and 100 $sec^{-1}$. In addition to viscosity, the foam was also ranked from 1 to 10 on foam stability based upon visual inspection wherein a scale of from 1 to 3 represented a foam having extreme gas breakout and slug flow throughout the test and which would not be recommended for pumping. A scale of from 8 to 10 represented a foam that was homogenous with very small bubble size and no gas breakout, akin to the consistency of shaving cream. Additional foam quality ratings are defined in Table I below.

TABLE I

| Foam Stability Rank | Foam Characterization |
|---|---|
| 1-3 | Extreme gas breakout. Severe slug flow. |
| 4-5 | Gas breakout at intermittent intervals. Usually will have larger bubble size. |
| 6-7 | A few bubbles of gas breakout, Good foam with small and medium bubble sizes. |
| 8-10 | Good foam. No gas breakout. Small bubble size. Shaving cream texture. |

The test temperature was 215° F. Foam flowing through the viewing cell suffered from frequent heavy slug flow at the start of testing. Later there was a continuous breakout of gas from the foam; at some times, gas slugs spanned the entire length of the viewing cell. The viscosity at 40 sec−1 was only 117 cP. The n' was calculated to be 0.3348 and K'=0.02832 $lb_f*sec^{n'}/ft^2$. The foam stability rank was ~1.

Example 2

Comparative Example 1 was repeated except that zirconium crosslinker was added to the foaming agent. In this case, 1.32 l of the modified foaming agent containing 1.1 l of 40 to 70% α-olefin sulfonate and 220 ml of the zirconium crosslinker used in Example 1 was added to the polymer solution. Afterward, 265 ml of a zirconium crosslinking agent containing 5.58% (by wt) zirconium (calculated as $ZrO_2$) and 70% (by vol.) carbon dioxide was added to the fluid while pumping into the foam flow loop. This formulation rendered a foam with fine to small bubbles. Gas breakout was significantly improved over the fluid tested in Example 1. The viscosity at 40 sec−1 was 1,225 cP and the n'=0.5320 and K'=0.14381 $lb_f*sec^{n'}/ft^2$. The foam stability rank was 4.5.

Example 2 illustrates that the addition of crosslinker prevents the foaming agent from competing with the polymer for crosslinking agent, resulting in more stable foams having higher viscosity.

Example 3

Example 3 was designed to evaluate the theological stability of the fluid in the absence of gas as a means of optimizing the liquid phase components. The method used is defined in the American Petroleum Institute's ANSI/API Recommended Practice 13M. The tests were conducted using an automated Fann 50 viscometer equipped with an R1 B5 cup (radius=1.8415 cm; length=14.240 cm) and bob (radius=1.5987 cm; length=8.7280 cm) assembly. The fluid was prepared by adding 3.6 g of carboxymethyl guar (degree of substitution of 0.17) to one liter of vigorously stirred tap water. The fluid was also treated with 1.0 ml of a surfactant blend labeled Inflo-150, 1.0 ml of a 50% (by wt) solution of tetramethyl ammonium chloride, 5.0 ml of an acetic acid sodium acetate buffer designed for pH 4.5 and a foaming agent composition as defined in Table II. The fluid was finally treated with 1.4 ml of a zirconium crosslinking agent containing 5.58% zirconium calculated as $ZrO_2$. After stirring for 60 sec., 48 ml of fluid was syringed out of the mixer and injected into a rheometer cup, replaced on the Fann 50 and pressured to 300 psi with $N_2$ gas. The fluid was initially subjected to a rate sweep using 102, 80.5, 60 and 38 $sec^{-1}$ shear rate while measuring stress at each rate for 30 sec. Afterward, the fluid was heated to 215° F. (102° C.) while shearing at 102 sec−1. Measurements were recorded every 60 sec and the initial rate sweep repeated every 30 min. The rate and stress were used to calculate the Power Law Indices, n' and K', as well as the apparent viscosity at 40 and 100 $sec^{-1}$. Testing was continued at that temperature for 128 min., the time needed to pump most fracturing foam treatments.

The data shown in Table II illustrates that the fluid viscosity and stability was dramatically increased when the foamer was pre-treated with a portion of the crosslinking agent.

TABLE II

| Total Foamer used in 1 l fluid (ml) | % Zr X-Linker in Foaming Agent (%) | 30 min μ (100 $sec^{-1}$-cP) | 60 min μ (100 $sec^{-1}$-cP) | 90 min μ (100 $sec^{-1}$-cP) | 120 min μ (100 $sec^{-1}$-cP) |
|---|---|---|---|---|---|
| 7.00 | 0 | 87 | 47 | 30 | 22 |
| 7.70 | 10 | 436 | 393 | 317 | 210 |
| 8.05 | 15 | 629 | 590 | 506 | 411 |
| 8.40 | 20 | 980 | 920 | 760 | 634 |
| 10.00 | 30 | 871 | 828 | 730 | 646 |
| 11.00 | 40 | 708 | 783 | 930 | 835 |

Table II illustrates that pre-treatment of a foaming agent with crosslinking agent prevents the foaming agent from competing with the polymer for the crosslinking agent. As a result, viscosification of the polymer solution more effectively proceeds and stability of the resulting fluid is improved by use of the pre-treatment mixture of foaming agent and crosslinking agent.

From the foregoing, it will be observed that numerous variations and modifications may be effected without departing from the true spirit and scope of the novel concepts of the invention.

What is claimed is:

1. A method of treating a subterranean formation penetrated by an oil or gas well which comprises:
   (a) formulating a well treatment fluid by;
      (i) adding to an aqueous fluid which contains a crosslinkable polymer a composition comprising a crosslinking agent and a foaming agent;
      (ii) adding additional crosslinking agent to the product of step(a)(i) to form a combination fluid; and (iii) adding gas or gaseous liquid to the product of step (a)(ii); and (b) introducing the well treatment fluid into the formation.

2. The method of claim 1, wherein the amount of crosslinkable polymer in the aqueous fluid prior to the addition of the composition is between from about 14 to about 160 pounds of crosslinkable polymer per 1,000 gallons of aqueous fluid.

3. The method of claim 2, wherein the amount of crosslinkable polymer in the aqueous fluid is between from about 18 to about 160 pounds of crosslinkable polymer per 1,000 gallons of aqueous fluid.

4. The method of claim 1, wherein the well treatment fluid is pumped into the subterranean formation for a time and at a pressure sufficient to fracture the formation.

5. The method of claim 4, wherein the amount of crosslinkable polymer in the aqueous fluid is between from about 14 to about 60 pounds of crosslinkable polymer per 1,000 gallons of aqueous fluid.

6. The method of claim 1, wherein the well treatment fluid forms a blocking gel within the subterranean formation.

7. The method of claim 6 wherein the amount of crosslinkable polymer in the aqueous fluid is between from about 40 to about 160 pounds of crosslinkable polymer per 1,000 gallons of aqueous fluid.

8. The method of claim 1, wherein the composition of step (a) is prepared on location.

9. The method of claim 1, wherein the foaming agent is selected from the group consisting of alkyl ether sulfates, alkoxylated ether sulfates, phosphate esters, alkyl ether phosphates, alkoxylated alcohol phosphate esters, alkyl sulfates and alpha olefin sulfonates.

10. The method of claim 1, wherein the mixture contains from about 60 to about 90 weight percent of foaming agent.

11. The method of claim 1, wherein the pH of the well treatment fluid is from about 3.0 to about 11.5.

12. The method of claim 1, wherein the crosslinking agent is a source of borate ions.

13. The method of claim 1, wherein the crosslinking agent contains a metal ion.

14. The method of claim 13, wherein the metal ion is selected from aluminum, antimony, chromium, zirconium and titanium.

15. The method of claim 1, wherein the crosslinkable polymer is selected from the group consisting of cellulosic derivatives, guar and guar derivatives, xanthan and carrageenan.

16. The method of claim 1, wherein the gas or gaseous liquid is selected from the group consisting of nitrogen, carbon dioxide, argon or natural gas.

17. A method of forming a blocking gel within a wellbore within a subterranean formation, the method comprising the steps of:
(a) adding to an aqueous fluid which contains a crosslinkable polymer a composition comprising a crosslinking agent and a foaming agent wherein the amount of crosslinkable polymer in the aqueous fluid is between from about 40 to about 160 pounds of crosslinkable polymer per 1000 gallons of aqueous fluid;
(b) adding additional crosslinking agent to the product of step (a);
(c) adding a gas or gaseous liquid to the product of step (b) to create a well treatment fluid; and
(d) pumping the well treatment fluid into the subterranean formation.

18. A method of fracturing a subterranean formation, comprising the steps of:
a) adding to an aqueous fluid which contains a crosslinkable polymer a composition comprising a crosslinking agent and a foaming agent wherein the amount of crosslinkable polymer in the aqueous fluid is between from about 14 to about 60 weight percent;
(b) adding additional crosslinking agent to the product of step (a);
(c) adding a gas or gaseous liquid to the product of step (b) to create a well treatment fluid; and
(d) pumping the well treatment fluid into the subterranean formation for a time and at a pressure sufficient to fracture the formation.

19. The method of claim 18, wherein the well treatment fluid contains a proppant.

* * * * *